US010253150B2

(12) United States Patent
Füssl et al.

(10) Patent No.: US 10,253,150 B2
(45) Date of Patent: *Apr. 9, 2019

(54) METHOD FOR PRODUCING EXPANDABLE GRANULATES CONTAINING POLYLACTIC ACID

(71) Applicant: BASF SE, Ludwigshafen (DE)

(72) Inventors: Andreas Füssl, Heidelberg (DE); Bangaru Dharmapuri Sriramulu Sampath, Bayreuth (DE); Maximilian Hofmann, Mannheim (DE); Ingo Bellin, Mannheim (DE); Sameer Nalawade, Mannheim (DE); Klaus Hahn, Kirchheim (DE); Andreas Künkel, Neustadt (DE); Robert Loos, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 284 days.

This patent is subject to a terminal disclaimer.

(21) Appl. No.: 14/938,095

(22) Filed: Nov. 11, 2015

(65) Prior Publication Data
US 2016/0060417 A1 Mar. 3, 2016

Related U.S. Application Data

(62) Division of application No. 13/522,031, filed as application No. PCT/EP2011/050129 on Jan. 6, 2011, now Pat. No. 9,212,270.

(30) Foreign Application Priority Data

Jan. 14, 2010 (EP) ..................................... 10150730
Dec. 2, 2010 (EP) ..................................... 10193484

(51) Int. Cl.
C08L 67/04 (2006.01)
C08J 9/12 (2006.01)
C08J 9/00 (2006.01)
C08J 9/16 (2006.01)
C08J 9/18 (2006.01)
C08L 33/06 (2006.01)
C08L 67/02 (2006.01)

(52) U.S. Cl.
CPC ............ C08J 9/127 (2013.01); C08J 9/0061 (2013.01); C08J 9/16 (2013.01); C08J 9/18 (2013.01); C08L 67/04 (2013.01); C08J 2333/14 (2013.01); C08J 2367/02 (2013.01); C08J 2367/04 (2013.01); C08J 2463/00 (2013.01); C08J 2467/02 (2013.01); C08L 33/068 (2013.01); C08L 67/02 (2013.01)

(58) Field of Classification Search
None
See application file for complete search history.

(56) References Cited

U.S. PATENT DOCUMENTS

| 5,817,721 | A | 10/1998 | Warzelhan et al. |
| 5,863,991 | A | 1/1999 | Warzelhan et al. |
| 5,880,220 | A | 3/1999 | Warzelhan et al. |
| 5,889,135 | A | 3/1999 | Warzelhan et al. |
| 5,936,045 | A | 8/1999 | Warzelhan et al. |
| 6,018,004 | A | 1/2000 | Warzelhan et al. |
| 6,046,248 | A | 4/2000 | Warzelhan et al. |
| 6,111,058 | A | 8/2000 | Warzelhan et al. |
| 6,120,895 | A | 9/2000 | Kowitz et al. |
| 6,258,924 | B1 | 7/2001 | Warzelhan et al. |
| 6,353,084 | B1 | 3/2002 | Warzelhan et al. |
| 6,573,308 | B1 | 6/2003 | Braun et al. |
| 8,268,901 | B2 | 9/2012 | Britton et al. |
| 8,372,512 | B2 | 2/2013 | Hirai et al. |
| 8,455,560 | B2 | 6/2013 | Dietrich et al. |
| 8,604,101 | B2 | 12/2013 | Ren et al. |
| 2010/0087556 | A1 | 4/2010 | Britton et al. |
| 2011/0034662 | A1 | 2/2011 | Witt et al. |

(Continued)

FOREIGN PATENT DOCUMENTS

DE 102008018964 A1 3/2009
EP 488617 A2 6/1992

(Continued)

OTHER PUBLICATIONS

U.S. Appl. No. 61/412,438.
U.S. Appl. No. 61/418,904.
Translation of DE 10 2008 018 964 A1 (originally submitted in IDS filed on Jul. 13, 2012).
Translation of JP 2007169394 (originally submitted in IDS filed on Jul. 13, 2013).
Translation of International Preliminary Report on Patentability of PCT/EP2011/050129 dated Sep. 3, 2012.
International Search Report for PCT/EP2001/050129 dated Jul. 7, 2011.
International Preliminary Report on Patentability for PCT/EP2011/050129 dated Apr. 13, 2012.
Data Sheet for Joncryl 4368C, BASF Corporation, Jan. 25, 2008.

Primary Examiner — Kara B Boyle
(74) Attorney, Agent, or Firm — Drinker Biddle & Reath LLP

(57) ABSTRACT

The invention relates to a process for producing expandable pelletized material which comprises polylactic acid which comprises the following steps:
a) melting and incorporation by mixing of polylactic acid, one or more further polymers, a diepoxide or polyepoxide, and one or more additives,
b) incorporation by mixing of an organic blowing agent into the polymer melt by means of a static or dynamic mixer at a temperature of at least 140° C.,
c) discharging through a die plate with holes, the diameter of which at the exit from the die is at most 1.5 mm, and
d) pelletizing the melt comprising blowing agent directly downstream of the die plate, and under water, at a pressure in the range from 1 to 20 bar.

The invention further relates to expandable pelletized material which comprises polylactic acid and which is obtainable by said process.

20 Claims, No Drawings

(56) References Cited

U.S. PATENT DOCUMENTS

| | | |
|---|---|---|
| 2011/0039999 A1 | 2/2011 | Witt et al. |
| 2011/0269873 A1 | 11/2011 | Seeliger et al. |
| 2011/0313075 A1* | 12/2011 | Siegenthaler ......... C08G 63/16 521/183 |
| 2012/0121905 A1 | 5/2012 | Ruckdaschel et al. |

FOREIGN PATENT DOCUMENTS

| | | | | |
|---|---|---|---|---|
| EP | 2135724 | A1 | 12/2009 | |
| JP | H08-253617 | A | 10/1996 | |
| JP | 2003-064213 | A | 3/2003 | |
| JP | 2007-100025 | A | 4/2007 | |
| JP | 2007169394 | A | 7/2007 | |
| JP | 2008-214422 | A | 9/2008 | |
| JP | WO 2008123367 | A1 * | 10/2008 | ............ B29B 9/065 |
| JP | 2009-057253 | A | 3/2009 | |
| JP | 2009-079202 | A | 4/2009 | |
| JP | 2010-525099 | A | 7/2010 | |
| WO | WO-92/09654 | A2 | 6/1992 | |
| WO | WO-9615173 | A1 | 5/1996 | |
| WO | WO-9615174 | A1 | 5/1996 | |
| WO | WO-9615175 | A1 | 5/1996 | |
| WO | WO-9615176 | A1 | 5/1996 | |
| WO | WO-96/21689 | A2 | 7/1996 | |
| WO | WO-9621690 | A1 | 7/1996 | |
| WO | WO-9621691 | A1 | 7/1996 | |
| WO | WO-9621692 | A1 | 7/1996 | |
| WO | WO-96/25446 | A1 | 8/1996 | |
| WO | WO-96/25448 | A1 | 8/1996 | |
| WO | WO-9812242 | A1 | 3/1998 | |
| WO | WO-01/12706 | A1 | 2/2001 | |
| WO | WO-2006074815 | A1 | 7/2006 | |
| WO | WO-2006/097353 | A1 | 9/2006 | |
| WO | WO-2008/098888 | A1 | 8/2008 | |
| WO | WO 2008/098889 | * | 8/2008 | ............ C08L 67/02 |
| WO | WO-08/130226 | A2 | 10/2008 | |
| WO | WO-2008/123367 | A1 | 10/2008 | |
| WO | WO-2008/130225 | A2 | 10/2008 | |
| WO | WO-2008/141766 | A1 | 11/2008 | |
| WO | WO-09/127555 | A1 | 10/2009 | |
| WO | WO-09/127556 | A1 | 10/2009 | |
| WO | WO-2009/135921 | A1 | 11/2009 | |
| WO | WO-2010034711 | A1 | 4/2010 | |

* cited by examiner

METHOD FOR PRODUCING EXPANDABLE GRANULATES CONTAINING POLYLACTIC ACID

RELATED APPLICATIONS

This application is a divisional application of U.S. Ser. No. 13/522,031, filed Jul. 13, 2012, and incorporated by reference herein in its entirety. U.S. Ser. No. 13/522,031 is a National Stage application (under 35 U.S.C. § 371) of PCT/EP2011/050129, filed Jan. 6, 2011, which claims benefit of European Patent Application No. 10150730.9, filed Jan. 14, 2010, and European Patent Application No. 10193484.2, filed Dec. 2, 2010.

FIELD OF THE INVENTION

The invention relates to a process for producing expandable pelletized material which comprises polylactic acid which comprises the following steps:
a) melting and mixing to incorporate the following components: i) from 50 to 99.9% by weight, based on the total weight of components i to iii, of polylactic acid, ii) from 0 to 49.9% by weight, based on the total weight of components i to iii, of one or more further polymers, iii) from 0.1 to 2% by weight, based on the total weight of components i to iii, of a diepoxide or polyepoxide, and iv) from 0 to 10% by weight, based on the total weight of components i to iii, of one or more additives,
b) mixing to incorporate v) from 3 to 7% by weight, based on components i to iv), of an organic blowing agent into the polymer melt by means of a static or dynamic mixer at a temperature of at least 140° C.,
c) discharging through a die plate with holes, the diameter of which at the exit from the die is at most 1.5 mm, and
d) pelletizing the melt comprising blowing agent directly downstream of the die plate, and under water, at a pressure in the range from 1 to 20 bar.

The invention further relates to expandable pelletized material which comprises polylactic acid and which is obtainable by said process, and also to specific expandable pelletized material which comprises polylactic acid and which has a proportion of from 3 to 7% by weight of an organic blowing agent, preferably n-pentane, or a mixture of n-pentane and isopentane (this mixture also being termed s-pentane) and particularly preferably isopentane. The invention further relates to a preferred process for producing expandable pelletized material which comprises blowing agent and which comprises polylactic acid, and which has low bulk density.

BACKGROUND

Processes for producing expandable pelletized material which comprises polylactic acid (moldable foams which comprise polylactic acid) have been described in general terms in WO 01/012706, but there is no mention of the specific polylactic acid mixture (see components i) to iv) in step a) or of the advantageous mode of operation via pressurized underwater pelletization (see steps c) to e) of the invention). There are wide ranges where this process does not give reproducible moldable foams and in particular does not prevent the premature foaming of the expandable pelletized material.

WO 08/130226 describes a complicated multistage process for producing expandable pelletized material which comprises polylactic acid, where the polylactic acid beads are coated and then post-impregnated with carbon dioxide, or the beads are post-impregnated with carbon dioxide and then coated. The post-impregnation with carbon dioxide leads to prefoamed beads, and this completely changes the technology for further processing of the moldable foams.

SUMMARY

It was an object of the present invention to provide a simple process which can give good results in producing expandable pelletized material which comprises polylactic acid and which has small pellet size and uniform pellet size distribution.

The process described in the introduction has accordingly been found.

The process of the invention is described in more detail below.

DETAILED DESCRIPTION

The polymer which comprises polylactic acid and which is produced in stage a) is generally a mixture of:
i) from 50 to 98.9% by weight, based on the total weight of components i to iii, of polylactic acid,
ii) from 1 to 49.9% by weight, based on the total weight of components i to iii, of at least one polyester based on aliphatic and/or aromatic dicarboxylic acids and on aliphatic dihydroxy compound,
iii) from 0.1 to 2% by weight, based on the total weight of components i to iii, of a copolymer which comprises epoxy groups and which is based on styrene, acrylate, and/or methacrylate, and
iv) from 0 to 10% by weight, based on the total weight of components i to iii, of one or more additives.

It is preferable that the polymer which comprises polylactic acid is composed of a mixture comprising:
i) from 50 to 98.9% by weight, particularly from 70 to 94.9% by weight based on the total weight of components i to iii, of polylactic acid,
ii) from 1 to 44.9% by weight, particularly from 5 to 29.9% by weight based on the total weight of components i to iii, of at least one polyester based on aliphatic dicarboxylic acids and on aliphatic dihydroxy compound or derived from polyalkylene succinate-co-terephthalate,
iii) from 0.1 to 2% by weight, in particular from 0.1 to 1% by weight based on the total weight of components i to iii, of a copolymer which comprises epoxy groups and which is based on styrene, acrylate, and/or methacrylate, and
iv) from 0.1 to 2% by weight, based on the total weight of components i to iii, of a nucleating agent.

It is particularly preferable that the polymer PM' which comprises polylactic acid is composed of a mixture comprising:
i) from 60 to 98.9% by weight, particularly from 65 to 79.9% by weight based on the total weight of components i to iii, of polylactic acid,
ii) from 1 to 39.9% by weight, particularly from 20 to 34.9% by weight based on the total weight of components i to iii, of at least one polyester based on:
  a) from 90 to 99.5 mol %, based on components i to ii, of succinic acid;
  b) from 0.5 to 10 mol %, based on components i to ii, of one or more $C_8$-$C_{20}$ dicarboxylic acids, preferably selected from terephthalic acid, azelaic acid, sebacic acid, and/or brassylic acid;
  c) from 98 to 102 mol %, based on components i to ii, of 1,3-propanediol or 1,4-butanediol;

iii) from 0.1 to 2% by weight, in particular from 0.1 to 1% by weight based on the total weight of components i to iii, of a copolymer which comprises epoxy groups and which is based on styrene, acrylate, and/or methacrylate, and iv) from 0 to 1% by weight, and preferably from 0.1 to 1% by weight, based on the total weight of components i to iii, of a nucleating agent.

As shown by inventive example 14, the last-mentioned polymer PM' comprising polylactic acid can be used to produce expandable pelletized material and, from this, foams with improved heat resistance, improved mechanical properties, and low density. Preference is therefore likewise given to the polymer PM' comprising polylactic acid and to the foams produced therefrom.

Component i) preferably comprises polylactic acid with the following property profile:
melt volume rate of from 0.5 to 15 ml/10 minutes, preferably from 1 to 9 ml/10 minutes, particularly preferably from 2 to 8 ml/10 minutes (MVR at 190° C. using 2.16 kg to ISO 1133)
melting point below 180° C.
glass transition temperature (Tg) above 40° C.
water content smaller than 1000 ppm
residual monomer content (lactide) smaller than 0.3%
molecular weight greater than 50 000 daltons.

Examples of preferred polylactic acids are the following from NatureWorks®: Ingeo® 2002 D, 4032 D, 4042 D and 4043 D, 8251 D, 3251 D, and in particular 8051 D, and also 8052 D. NatureWorks 8051 D and 8052 D are polylactic acids from NatureWorks, being products with the following properties: Tg: 65.3° C., Tm: 153.9° C., MVR: 6.9 [ml/10 minutes], $M_w$: 186 000, Mn: 107 000. These products moreover have a slightly higher acid number.

Polylactic acids that have proven particularly advantageous for producing the expandable pelletized material of the invention have MVR of from 5 to 8 ml/10 minutes to ISO 1133 [190° C./2.16 kg].

Polylactic acids which are particularly suitable have the abovementioned MVR range and/or have a low-temperature-crystallization onset temperature in the range from 80° C. to 125° C., preferably from 90° C. to 115° C., and particularly preferably from 95° C. to 105° C., measured by means of DSC (differential scanning calorimetry) at a heating rate of 20K/min (measurement range from −60° C. to 220° C.; Mettler DSC 30 using a TC15/TA controller, Mettler-Toledo AG).

It has been found that under the abovementioned conditions most of the types of polylactic acid obtainable on the market have a low-temperature-crystallization onset temperature below 80° C. Comparison of NatureWorks® 8051 D, 8052D and 4042D polylactic acids (PLAs) will clearly show (see table) the different crystallization behavior of the pelletized material produced therefrom. The table shows DSC measurements on expandable pelletized material from two types of PLA, which were respectively nucleated with 0.3% by weight of talc and charged with 5.7% by weight of n-pentane as blowing agent.

TABLE

DSC data for a heating rate of 20 K/min (measurement range from −60° C. to 220° C.)

| Example | Tg (glass transition temp.) | Tc onset | Tc (low-temperature cryst.) | Tm (melting point) |
|---|---|---|---|---|
| PLA 4042 D | 42.4° C. | 71.8° C. | 82.5° C. | 155.6° C. |
| PLA 8051 D | 41.1° C. | 94.7° C. | 106.9° C. | 147.6° C. |

The crystalline content of the expandable pelletized material after the production process is generally only a few percent; the material is therefore predominantly amorphous. A higher low-temperature-crystallization onset temperature in the region of 80° C. to 125° C., preferably from 90° C. to 115° C., and particularly preferably from 95° C. to 105° C., favors foaming by steam. Types of PLAs such as NatureWorks® 8051 D and 8052D provide an ideal balance between tendency towards crystallization and foaming behavior in the expandable pelletized material.

Component ii is aliphatic or semiaromatic (aliphatic-aromatic) polyesters.

As mentioned, purely aliphatic polyesters are suitable as component ii). Aliphatic polyesters are polyesters derived from aliphatic $C_2$-$C_{12}$ alkanediols and from aliphatic $C_4$-$C_{36}$ alkanedicarboxylic acids, e.g. polybutylene succinate (PBS), polybutylene adipate (PBA), polybutylene succinate adipate (PBSA), polybutylene succinate sebacate (PBSSe), polybutylene sebacate adipate (PBSeA), polybutylene sebacate (PBSe), or corresponding polyesteramides. The aliphatic polyesters are marketed by Showa Highpolymers as Bionolle, and by Mitsubishi as GSPIa. EP08165370.1 describes relatively recent developments.

The intrinsic viscosities of the aliphatic polyesters are generally from 150 to 320 cm³/g and preferably from 150 to 250 cm³/g, to DIN 53728.

MVR (melt volume rate) is generally from 0.1 to 70 cm³/10 min., preferably from 0.8 to 70 cm³/10 min., and in particular from 1 to 60 cm³/10 min., to EN ISO 1133 (190° C., 2.16 kg weight).

Acid numbers are generally from 0.01 to 1.2 mg KOH/g, preferably from 0.01 to 1.0 mg KOH/g, and particularly preferably from 0.01 to 0.7 mg KOH/g, to DIN EN 12634.

Semiaromatic polyesters, which are likewise suitable as component ii), are composed of aliphatic diols and of aliphatic, and also aromatic, dicarboxylic acids. Among the suitable semiaromatic polyesters are linear non-chain-extended polyesters (WO 92/09654). Particularly suitable partners in a mixture are aliphatic/aromatic polyesters derived from butanediol, from terephthalic acid, and from aliphatic $C_4$-$C_{18}$ dicarboxylic acids, such as succinic acid, glutaric acid, adipic acid, suberic acid, azelaic acid, sebacic acid, and brassylic acid (for example as described in WO 2006/097353 to 56). It is preferable to use chain-extended and/or branched semiaromatic polyesters as component ii. The latter are known from the following specifications mentioned in the introduction: WO 96/15173 to 15176, 21689 to 21692, 25446, 25448 or from WO 98/12242, expressly incorporated herein by way of reference. It is also possible to use a mixture of different semiaromatic polyesters.

Biodegradable, aliphatic-aromatic polyesters ii are particularly suitable for the process of the invention for producing moldable foams, where these polyesters comprise:

a) from 40 to 70 mol %, based on components a to b, of one or more dicarboxylic acid derivatives or dicarboxylic acids selected from the group consisting of: succinic acid, adipic acid, sebacic acid, azelaic acid, and brassylic acid;

b) from 60 to 30 mol %, based on components a to b, of a terephthalic acid derivative;

c) from 98 to 102 mol %, based on components a to b, of a $C_2$-$C_8$ alkylenediol or $C_2$-$C_6$ oxyalkylenediol;

d) from 0.00 to 2% by weight, based on the total weight of components a to c, of a chain extender and/or crosslinking agent selected from the group consisting of: a di- or polyfunctional isocyanate, isocyanurate, oxazoline, epoxide, peroxide, and carboxylic anhydride, and/or an at least trihydric alcohol, or an at least tribasic carboxylic acid.

Aliphatic-aromatic polyesters ii used with preference comprise:
a) from 50 to 65 mol %, and in particular 58 mol % based on components i to ii, of one or more dicarboxylic acid derivatives or dicarboxylic acids selected from the group consisting of: succinic acid, azelaic acid, brassylic acid, and preferably adipic acid, particularly preferably sebacic acid;
b) from 50 to 35 mol %, and in particular 42 mol % based on components i to ii, of a terephthalic acid derivative;
c) from 98 to 102 mol %, based on components i to ii, of 1,4-butanediol, and
d) from 0 to 2% by weight, preferably from 0.01 to 2% by weight, based on the total weight of components i to iii, of a chain extender and/or crosslinking agent selected from the group consisting of: a polyfunctional isocyanate, isocyanurate, oxazoline, carboxylic anhydride, such as maleic anhydride, or epoxide (in particular an epoxidized poly(meth)acrylate), and/or an at least trihydric alcohol, or an at least tribasic carboxylic acid.

Aliphatic dicarboxylic acids that are preferably suitable are succinic acid, adipic acid, and with particular preference sebacic acid. An advantage of polyesters which comprise succinic acid and which comprise sebacic acid are that they are also available in the form of renewable raw material.

Polyesters ii used with preference comprise:
a) from 90 to 99.5 mol %, based on components i to ii, of succinic acid;
b) from 0.5 to 10 mol %, based on components i to ii, of one or more $C_8$-$C_{20}$ dicarboxylic acids, and
c) from 98 to 102 mol %, based on components i to ii, of 1,3-propanediol or 1,4-butanediol.

Polyesters ii used with particular preference comprise:
a) from 90 to 99.5 mol %, based on components i to ii, of succinic acid;
b) from 0.5 to 10 mol %, based on components i to ii, of terephthalic acid, azelaic acid, sebacic acid, and/or brassylic acid;
c) from 98 to 102 mol %, based on components i to ii, of 1,3-propanediol or 1,4-butanediol, and
d) from 0.01 to 5% by weight, based on the total weight of components i to iii, of a chain extender and/or crosslinking agent selected from the group consisting of: a polyfunctional isocyanate, isocyanurate, oxazoline, epoxide (in particular an epoxidized poly(meth)acrylate), an at least trihydric alcohol, or an at least tribasic carboxylic acid.

The polyesters ii described are synthesized by the processes described in WO-A 92/09654, WO-A 96/15173, or preferably in WO-A 09/127555, and WO-A 09/127556, preferably in a two-stage reaction cascade. The dicarboxylic acid derivatives are first reacted with a diol in the presence of a transesterification catalyst, to give a prepolyester. The intrinsic viscosity (IV) of said prepolyester is generally from 50 to 100 ml/g, preferably from 60 to 80 ml/g. The catalysts used usually comprise zinc catalysts, aluminum catalysts, and in particular titanium catalysts. An advantage of titanium catalysts, such as tetra(isopropyl) orthotitanate and in particular tetrabutyl orthotitanate (TBOT) over the tin catalysts, antimony catalysts, cobalt catalysts, and lead catalysts frequently used in the literature, an example being tin dioctoate, is that when residual amounts of the catalyst or a product formed from the catalyst are retained in the product they are less toxic. This is particularly important in the case of biodegradable polyesters, since they can pass directly into the environment by way of the composting process.

The polyesters ii are then produced in a second step by the processes described in WO-A 96/15173 and EP-A 488 617. The prepolyester is reacted with chain extenders vib), for example with diisocyanates or with epoxide-containing polymethacrylates, in a chain-extending reaction that gives a polyester with IV of from 50 to 450 ml/g, preferably from 80 to 250 ml/g.

The process generally uses from 0.01 to 2% by weight, preferably from 0.1 to 1.0% by weight, and with particular preference from 0.1 to 0.3% by weight, based on the total weight of components i to iii, of a crosslinking agent (d') and/or chain extender (d) selected from the group consisting of: a polyfunctional isocyanate, isocyanurate, oxazoline, epoxide, peroxide, carboxylic anhydride, an at least trihydric alcohol, or an at least tribasic carboxylic acid. Chain extenders d that can be used are polyfunctional, and in particular difunctional, isocyanates, isocyanurates, oxazolines, carboxylic anhydride, or epoxides.

Chain extenders, and also alcohols or carboxylic acid derivatives having at least three functional groups, can also be interpreted as crosslinking agents d'. Particularly preferred compounds have from three to six functional groups. Examples that may be mentioned are: tartaric acid, citric acid, malic acid; trimethylolpropane, trimethylolethane; pentaerythritol; polyethertriols and glycerol, trimesic acid, trimellitic acid, trimellitic anhydride, pyromellitic acid, and pyromellitic dianhydride. Preference is given to polyols, such as trimethylolpropane, pentaerythritol, and in particular glycerol. By using components d and d' it is possible to construct biodegradable polyesters which are pseudoplastic. The rheological behavior of the melts improves; the biodegradable polyesters are easier to process. The compounds d act to reduce viscosity under shear, i.e. viscosity at relatively high shear rates is reduced.

The number-average molar mass (Mn) of the polyesters ii is generally in the range from 5000 to 100 000 g/mol, in particular in the range from 10 000 to 75 000 g/mol, preferably in the range from 15 000 to 38 000 g/mol, while their weight-average molar mass (Mw) is generally from 30 000 to 300 000 g/mol, preferably from 60 000 to 200 000 g/mol, and their Mw/Mn ratio is from 1 to 6, preferably from 2 to 4. Intrinsic viscosity is from 50 to 450 g/ml, preferably from 80 to 250 g/ml (measured in o-dichlorobenzene/phenol (ratio by weight 50/50)). The melting point is in the range from 85 to 150° C., preferably in the range from 95 to 140° C.

The polyesters mentioned can have hydroxy and/or carboxy end groups in any desired ratio. The semiaromatic polyesters mentioned can also be end-group-modified. By way of example, therefore, OH end groups can be acid-modified via reaction with phthalic acid, phthalic anhydride, trimellitic acid, trimellitic anhydride, pyromellitic acid, or pyromellitic anhydride. Preference is given to polyesters having acid numbers smaller than 1.5 mg KOH/g.

The biodegradable polyesters ii can comprise further ingredients which are known to the person skilled in the art but which are not essential to the invention. By way of example, the additional materials conventional in plastics technology, such as stabilizers; nucleating agents; lubricants and release agents, such as stearates (in particular calcium stearate); plasticizers, such as citric esters (in particular tributyl acetyl citrate), glycerol esters, such as triacetylglycerol, or ethylene glycol derivatives, surfactants, such as polysorbates, palmitates, or laurates; waxes, such as beeswax or beeswax ester; antistatic agent, UV absorber, UV stabilizer; antifogging agents, or dyes. The concentrations used of the additives are from 0 to 5% by weight, in particular from 0.1 to 2% by weight, based on the polyesters of the invention. The amount of plasticizers comprised in the polyesters of the invention can be from 0.1 to 10% by weight.

Component iii) is described in more detail below.

Epoxides are in particular a copolymer which is based on styrene, acrylate, and/or methacrylate, and which contains epoxy groups. The units bearing epoxy groups are preferably glycidyl (meth)acrylates. Copolymers that have proven advantageous have a proportion of glycidyl methacrylate greater than 20% by weight, particularly preferably greater than 30% by weight, and with particular preference greater than 50% by weight, based on the copolymer. The epoxide equivalent weight (EEW) in these polymers is preferably from 150 to 3000 g/equivalent and with particular preference from 200 to 500 g/equivalent. The average molecular weight (weight average) $M_w$ of the polymers is preferably from 2000 to 25 000, in particular from 3000 to 8000. The average molecular weight (number average) $M_n$ of the polymers is preferably from 400 to 6000, in particular from 1000 to 4000. Polydispersity (Q) is generally from 1.5 to 5. Copolymers of the abovementioned type containing epoxy groups are marketed by way of example by BASF Resins B.V. as Joncryl® ADR. Joncryl® ADR 4368 is particularly suitable as chain extender.

Component iv is in particular one or more of the following additives: stabilizer, nucleating agent, lubricant and release agent, surfactant, wax, antistatic agent, antifogging agent, dye, pigment, UV absorber, UV stabilizer, or other plastics additive. It is particularly preferable as mentioned above to use from 0.5 to 1% by weight, based on components i and ii, of a nucleating agent. Nucleating agent is in particular talc, chalk, carbon black, graphite, calcium stearate or zinc stearate, poly-D-lactic acid, N,N'-ethylenebis-12-hydroxystearamide, or polyglycolic acid. Talc is particularly preferred as nucleating agent.

The blowing agent can be interpreted as further component v.

The polymer melt comprising blowing agent generally comprises a total proportion of from 2 to 10% by weight, preferably from 3 to 7% by weight, based on the polymer melt comprising blowing agent, of one or more blowing agents homogeneously dispersed. Suitable blowing agents are the physical blowing agents conventionally used in EPS, e.g. aliphatic hydrocarbons having 2 to 7 carbon atoms, alcohols, ketones, ethers, amides, or halogenated hydrocarbons. It is preferable to use isobutane, n-butane, n-pentane, and in particular isopentane. Preference is further given to mixtures of n-pentane and isopentane.

The amount added of blowing agent is selected in such a way that the expansion capability α of the expandable pelletized material, defined as bulk density prior to the prefoaming process, is from 500 to 800 kg/m³ and preferably from 580 to 750 kg/m³, and its bulk density after the prefoaming process is at most 125 kg/m³, preferably from 8 to 100 kg/m³.

When fillers are used, bulk densities in the range from 590 to 1200 g/l can arise as a function of the nature and amount of the filler.

The following materials can also be added to the polymer melt, together or with spatial separation: additives, nucleating agents, fillers, plasticizers, flame retardants, soluble and insoluble inorganic and/or organic dyes and pigments, examples being IR absorbers, e.g. carbon black, graphite, or aluminum powder, for example by way of mixers or ancillary extruders. The amounts generally added of the dyes and pigments are in the range from 0.01 to 10% by weight, preferably in the range from 1 to 5% by weight. To achieve homogeneous and microdisperse distribution of the pigments within the polymer, it can be advantageous, particularly in the case of polar pigments, to use a dispersing agent, e.g. organosilanes, epoxidized polymers, or maleic-anhydride-grafted polymers. Preferred plasticizers are mineral oils, or phthalates, and the amounts used of these can be from 0.05 to 10% by weight, based on the polymer.

To produce the expandable pelletized material of the invention, the blowing agent is incorporated by mixing into the polymer melt. The process comprises the following stages: A) production of melt, B) mixing, C) conveying, and D) pelletizing. Each of said stages can be executed by the apparatuses or apparatus combinations known in plastics processing. For the incorporation-by-mixing process, static or dynamic mixers are suitable, examples being extruders. The polymer melt can be produced directly via melting of pelletized polymer material. If necessary, the temperature of the melt can be lowered by using a cooler. Examples of methods that can be used for pelletizing are pressurized underwater pelletization, and pelletization using rotating knives and spray-mist cooling by temperature-control liquids. Examples of suitable arrangements of apparatus for conducting the process are:

i) extruder-static mixer-cooler-pelletizer
ii) extruder-pelletizer.

The arrangement can moreover have an ancillary extruder for introducing additives, e.g. solids or additional materials that are heat-sensitive.

The temperature at which the polymer melt comprising blowing agent is conveyed through the die plate is generally in the range from 140 to 300° C., preferably in the range from 160 to 240° C.

The die plate is heated at least to the temperature of the polymer melt comprising blowing agent. It is preferable that the temperature of the die plate is in the range from 20 to 100° C. above the temperature of the polymer melt comprising blowing agent. This inhibits formation of polymer deposits within the dies and ensures that pelletization is problem-free.

In order to obtain marketable pellet sizes, the diameter (D) of the die holes at the exit from the die should be in the range from 0.1 to 2 mm, preferably in the range from 0.1 to 1.2 mm, particularly preferably in the range from 0.1 to 0.8 mm. Even after die swell, this permits controlled setting of pellet sizes below 2 mm, in particular in the range from 0.2 to 1.4 mm.

Die swell can be affected not only by molecular-weight distribution but also by the geometry of the die. The die plate preferably has holes with an L/D ratio of at least 2, where the length (L) corresponds to that region of the die where the diameter is at most the diameter (D) at the exit from the die. The L/D ratio is preferably in the range from 3 to 20.

The diameter (E) of the holes at the entry to the die plate should generally be at least twice as large as the diameter (D) at the exit from the die.

One embodiment of the die plate has holes with conical inlet and an inlet angle α smaller than 180°, preferably in the range from 30 to 120°. In another embodiment, the die plate has holes with a conical outlet and an outlet angle β smaller than 90°, preferably in the range from 15 to 45°. In order to produce controlled pellet size distributions in the polymers, the die plate may be equipped with holes of different discharge diameter (D). The various embodiments of die geometry can also be combined with one another.

One preferred process for producing expandable pelletized material which comprises polylactic acid comprises the following steps:

a) melting and mixing to incorporate components i) from 50 to 99.9% by weight of polylactic acid, ii) from 0 to 50% by weight of one or more further polymers, iii) from 0.1 to 2% by weight of a diepoxide or polyepoxide, and iv) from 0 to 3% by weight of one or more additives, b) mixing to incorporate an organic blowing agent into the polymer melt optionally by means of a static or dynamic mixer at a temperature of at least 140° C., preferably from 180 to 260° C., and optional cooling of the polymer melt comprising blowing agent to a temperature of from 120 to 160° C. by means of an intervening cooling apparatus, prior to discharge, c) discharging through a die plate with holes, the diameter of which at the exit from the die is at most 1.5 mm, and d) pelletizing the melt comprising blowing agent directly downstream of the die plate, and under water, at a pressure in the range from 1 to 20 bar.

It has moreover been found that lowering the temperature to from 5 to 20° C. during the underwater pelletization process gives expandable pellets which comprise polylactic acid and which have defined cavities with average diameter in the range from 0.1 to 50 µm. The average diameter of the pelletized material is generally in the range from 0.1 to 2 mm, with from 50 to 300 cavities/mm$^2$ of cross-sectional area. The temperature reduction during the underwater pelletization process can reduce bulk density to the range from 580 to 750 kg/m$^3$ and preferably from 580 to 720 kg/m$^3$. The expandable pelletized material produced in this way and comprising polylactic acid moreover has increased shelf life. It can still be foamed without difficulty after a period of weeks.

The following preferred procedure can also be used to achieve the reduction in bulk density and increase in shelf life of the expandable pelletized material which comprises polylactic acid:

a) melting and mixing to incorporate components i) from 50 to 99.9% by weight, based on the total weight of components i to iii, of polylactic acid, ii) from 0 to 49.9% by weight, based on the total weight of components i to iii, of one or more further polymers, iii) from 0.1 to 2% by weight, based on the total weight of components i to iii, of a diepoxide or polyepoxide, and iv) from 0.1 to 5% by weight, based on the total weight of components i to iii, of a nucleating agent, b) mixing to incorporate v) from 1 to 7% by weight, based on the total weight of components i to iv, of an organic blowing agent and iv) from 0.01 to 5% by weight of a co-blowing agent—selected from the group of nitrogen, carbon dioxide, argon, helium, and mixtures thereof—into the polymer melt optionally by means of a static or dynamic mixer at a temperature of at least 140° C., c) discharging through a die plate with holes, the diameter of which at the exit from the die is at most 1.5 mm, and d) pelletizing the melt comprising blowing agent directly downstream of the die plate, and under water, at a pressure in the range from 1 to 20 bar.

By using volatile, liquid/gaseous co-blowing agents vi) which form cavities, it is possible to establish, in the expandable pelletized material, a cellular structure which can improve the subsequent foaming procedure and can control cell size.

Suitable nucleating agents iv) and blowing agents v) are the materials described above.

The process for establishing said cavity morphology can also be termed prenucleation, where the cavities are in essence formed by the co-blowing agent vi).

The co-blowing agent vi) which forms the cavities differs from the actual blowing agent v) in its solubility in the polymer. In the production process, blowing agent v) and co-blowing agent vi) are first dissolved completely in the polymer at sufficiently high pressure. The pressure is then reduced, preferably within a short time, and the solubility of the co-blowing agent vi) is thus reduced. Phase separation therefore occurs in the polymeric matrix, and a prenucleated structure is produced. The actual blowing agent v) remains mainly dissolved in the polymer, because it has higher solubility and/or lower diffusion rate. It is preferable to carry out a temperature reduction at the same time as the pressure reduction, in order to prevent excessive nucleation of the system and to reduce the extent of escape of the actual blowing agent v) by diffusion. This is achieved by using co-blowing agent vi) in conjunction with ideal pelletizing conditions.

It is preferable that at least 80% by weight of the co-blowing agent F) escapes within 24 h from the expandable thermoplastic beads during storage at 25° C., atmospheric pressure, and 50% relative humidity. The solubility of the co-blowing agent F) in the expandable thermoplastic beads is preferably below 0.1% by weight.

The amount of the co-blowing agent F) used that is added during the prenucleation process should in all cases exceed the maximum solubility under the prevailing process conditions. It is therefore preferable to use co-blowing agents vi) which have low, but sufficient, solubility in the polymer. Among these are in particular gases such as nitrogen, carbon dioxide, air, and noble gases, particularly preferably nitrogen, the solubility of which in many polymers decreases at low temperatures and pressures. However, it is also possible to use other liquid additives.

It is particularly preferable to use inert gases, such as nitrogen and carbon dioxide. Features of both gases, alongside their suitable physical properties, are low costs, good availability, easy handling, and unreactive or inert behavior. By way of example, degradation of the polymer hardly ever occurs in the presence of the two gases. The gases themselves are obtained from the atmosphere, and their effect on the environment is therefore also neutral.

The amount used of the co-blowing agent vi) here should: (a) be sufficiently small that it dissolves under the prevailing melt temperatures and melt pressures during the melt-impregnation process prior to the pelletization process; (b) be sufficiently high to demix from the polymer under the water pressure of pelletization and at the pelletization temperature, and cause nucleation. In one preferred embodiment, at least one of the blowing agents used is gaseous at room temperature and atmospheric pressure.

It is particularly preferable to use talc powder as nucleating agent iv) in combination with nitrogen as co-blowing agent vi).

Equipment that can be used for the transport and storage of the expandable pelletized material is inter alia metal drums and octabins. When drums are used, a factor to be considered is that the release of the co-blowing agents vi) can sometimes cause a pressure increase in the drum. Packing means preferably used are therefore open packs, such as octabins or drums which permit depressurization through permeation of the gas out of the drum. Particular preference is given here to drums which permit escape of the co-blowing agent vi) by diffusion and minimize or prevent escape of the actual blowing agent v) by diffusion. This is possible by way of example by selecting a sealing material appropriate to the blowing agent and, respectively, the co-blowing agent vi). The permeability of the sealing material to the co-blowing agent vi) is preferably higher by at least a factor of 20 than the permeability of the sealing material to the blowing agent v).

The prenucleation process, for example through addition of small amounts of nitrogen and carbon dioxide, can establish a cellular morphology within the expandable pelletized material comprising blowing agent. The average cell size in the center of the bead here can be greater than in the peripheral regions, and the density in the peripheral regions of the beads can be higher. Losses of blowing agent are thus minimized as far as possible.

The prenucleation process can achieve a markedly better cell size distribution and a reduction in cell size after the prefoaming process. The amount required of blowing agent to achieve a minimal bulk density is moreover smaller, and the material has improved shelf life. Small amounts of nitrogen or carbon dioxide added to the melt can markedly reduce prefoaming times at constant blowing agent content, or can markedly reduce amounts of blowing agent at constant foaming times and minimal foam densities. The prenucleation process moreover improves product homogeneity and process stability.

Reimpregnation of the pelletized polymer material of the invention with blowing agents can moreover be markedly quicker than is the case with pelletized material of identical constitution but of compact, i.e. noncellular, structure. Firstly, the diffusion times are smaller, and secondly, by analogy with directly impregnated systems, amounts of blowing agent required for the foaming process are smaller.

Finally, the prenucleation process can reduce the blowing agent content required to achieve a certain density, and can thus reduce the demolding times during production of a molding or of a slab. It is thus possible to reduce the costs of further processing and to improve product quality.

The principle of the prenucleation process can be utilized not only for suspension technology but also for melt-impregnation technology to produce expandable beads. Preference is given to the application in the melt extrusion process in which the addition of the co-blowing agents vi) is pelletized by pressure-assisted underwater pelletization after discharge of the melt loaded with blowing agent. The microstructure of the pelletized material can be controlled as described above via selection of the pelletization parameters and of the co-blowing agent vi).

By using relatively high amounts of co-blowing agent vi), for example in the range from 1 to 10% by weight, based on the polymer melt comprising blowing agent, it is possible to lower the melt temperature or the melt viscosity and thus increase throughput markedly. This can also provide a non-aggressive method of incorporating thermally labile additives, such as flame retardants, into the polymer melt. There is no resultant alteration of the constitution of the expandable thermoplastic beads, since the co-blowing agent in essence escapes during the melt extrusion process. It is preferable to use $CO_2$ in order to utilize said effect. In the case of $N_2$, the effects on viscosity are smaller. Nitrogen is therefore mainly used to establish the desired cell structure.

The liquid-filled chamber for pelletizing the expandable thermoplastic polymer beads is preferably operated at a temperature in the range from 20 to 80° C., particularly preferably in the range from 30 to 60° C.

In order to minimize thermal degradation of the polylactic acid it is moreover advantageous in all of the stages of the process to minimize the amount of mechanical and thermal energy introduced. The average shear rates in the screw channel should be small, and preference is given to maintenance of shear rates below 250/sec, preferably below 100/sec, and to temperatures below 260° C., and also to short residence times in the range from 2 to 10 minutes in stages c) and d). The residence times are generally from 1.5 to 4 minutes in the absence of a cooling step, and generally from 5 to 10 minutes if there is a cooling step provided. The polymer melt can be conveyed and discharged by using pressurizing pumps, e.g. gear pumps.

To improve processability, the finished expandable pelletized material can be coated with glycerol ester, with antistatic agents, or with anticaking agents.

The expandable pelletized material of the invention exhibits relatively little caking when compared with pelletized material which comprises low-molecular-weight plasticizers, and features low pentane loss during storage.

In a first step, hot air or steam can be used to prefoam the expandable pelletized material of the invention to give foam beads of density in the range from 8 to 100 kg/m$^3$, and in a $2^{nd}$ step the material can be fused in a closed mold to give moldings composed of beads.

Surprisingly, the foam beads have markedly higher crystallinity than the expandable pelletized material. Crystallinity can be determined with the aid of differential thermal analysis (DSC). The crystalline content of the expandable pelletized material after the production process is generally only a few percent—the material therefore being predominantly amorphous—whereas the crystallinity of the foamed beads is markedly higher: from 8 to 40%, and, associated with this, they have markedly higher heat resistance. Surprisingly, this effect is markedly more pronounced when the polymers used which comprise polylactic acid comprise from 1 to 49.9% by weight and preferably from 1 to 29.9% by weight of an aliphatic or semiaromatic polyester (component ii) than for a polymer which comprises polylactic acid but comprises no component ii. Component ii) appears to exert a nucleating effect on the polymer which comprises polylactic acid. Interestingly, the foaming process achieves high crystallinity of the foam beads without any impairment of the foaming behavior of the expandable pelletized material.

The pelletized material produced by the process of the invention has high biodegradability together with good foaming properties.

For the purposes of the present invention, a substance or substance mixture complies with the "biodegradable" feature if said substance or substance mixture exhibits a percentage degree of biodegradation of at least 90% to DIN EN 13432.

Biodegradability generally leads to decomposition of the pelletized material or foams produced therefrom in an appropriate and demonstrable period of time. The degradation can take place by an enzymatic, hydrolytic, or oxidative route, and/or via exposure to electromagnetic radiation, such as UV radiation, and can mostly be brought about predominantly via exposure to microorganisms, such as bacteria, yeasts, fungi, and algae. Biodegradability can be quantified by way of example by mixing polyester with compost and storing it for a particular period. By way of example, according to DIN EN 13432, $CO_2$-free air is passed through ripened compost during the composting process, and the compost is subjected to a defined temperature profile. The biodegradability here is defined as a percentage degree of biodegradation by taking the ratio of the net amount of $CO_2$ released from the specimen (after subtraction of the amount of $CO_2$ released by the compost without specimen) to the maximum amount of $CO_2$ that can be released from the specimen (calculated from the carbon content of the specimen). Biodegradable pelletized material generally exhibits marked signs of degradation after just a few days of composting, examples being fungal growth, cracking, and perforation.

Other methods for determining biodegradability are described by way of example in ASTM D5338 and ASTM D6400-4.

EXAMPLES

Materials Used

Component i:
i-1: Aliphatic polyester, Natureworks® 8051D polylactide from NatureWorks.
Component ii:
ii-1: To produce the polyester ii-1, 87.3 kg of dimethyl terephthalate, 80.3 kg of adipic acid, 117 kg of 1,4-butanediol, and 0.2 kg of glycerol were mixed together with 0.028 kg of tetrabutyl orthotitanate (TBOT), the molar ratio between alcohol component and acid components being 1.30. The reaction mixture was heated to a temperature of 180° C. and reacted for 6 h at this temperature. The temperature was then increased to 240° C., and the excess dihydroxy compound was removed by distillation in vacuo over a period of 3 h. 0.9 kg of hexamethylene diisocyanate was then slowly metered into the mixture at 240° C. within a period of 1 h.

The melting point of the resultant polyester ii-1 was 119° C., its molar mass ($M_n$) being 23 000 g/mol (corresponds to Ecoflex® FBX 7011, produced by BASF SE).
ii-2: To produce the polyester ii-2, 14.89 kg of sebacic acid, 165.18 kg of succinic acid, 172.5 kg of 1,4-butanediol, and 0.66 kg of glycerol were mixed together with 0.031 kg of tetrabutyl orthotitanate (TBOT) in a 450 liter polycondensation tank, the molar ratio of alcohol components to acid component being 1.30. The reaction mixture was heated to an internal temperature of 200° C., with removal of water by distillation, and was kept at said temperature for 1 h. The temperature was then increased to an internal temperature of about 250-260° C., and at the same time the excess 1,4-butanediol was removed by distillation, with application of vacuum (final vacuum about 3-20 mbar). The polycondensation process was terminated by cooling to about 180-200° C. once the desired final viscosity had been reached, and the prepolyester was chain-extended with 1.5 kg of hexamethylene diisocyanate for 1 h at 240° C., and pelletized.

The molar mass (Mn) of the resultant polyester ii-2 was 37 000 g/mol.
Component iii:
iii-1: Joncryl® ADR 4368 CS from BASF SE.
Component iv:
iv-1: Chinatalc HP 325 from Luzenac
Component v:
v-1: Blowing agent: isopentane
v-2: Blowing agent: n-pentane
Component vi:
vi-1: Co-blowing agent: nitrogen ($N_2$)
vi-2: Co-blowing agent: carbon dioxide ($CO_2$)

The proportions correspond to % by weight and are based on 100% by weight of polymer (components i to iii)

Inventive Example 1

5.7 parts of isopentane (component v-1) were incorporated by mixing, in an extruder (Leistritz 18 mm), into a melt made of 79.6 parts of i-1, 20 parts of component ii-1, 0.4 part of component iii-1, and 0.3 part of component iv-1, at a melt temperature of from 200° C. to 220° C. The stated amounts in parts are based on the entire amount of components i-1, ii-1, and iii-1.

The melt was conveyed at throughput 3.5 kg/h through a die plate with one hole (die diameter 0.65 mm). Compact pelletized material with narrow size distribution was produced with the aid of pressurized (12 bar) underwater pelletization (water temperature 40° C.). The average particle size was 1.4 mm. The density of the impregnated pelletized material (crude beads) was 742 kg/m³.

A stream of steam was used to prefoam the pelletized material. The bulk density of the foamed beads of pelletized material was 32 kg/m³. After 16 weeks it was no longer possible to foam the beads of pelletized material.

Inventive Example 2

5.7 parts of isopentane (component v-1) were incorporated by mixing into a melt made of 99.6 parts of component i-1, 0.4 part of component iii-1, and 0.3 part of component iv-1, at a melt temperature of from 200° C. to 220° C.

The melt was conveyed at throughput 3.5 kg/h through a die plate with one hole (die diameter 0.65 mm). Compact pelletized material with narrow size distribution was produced with the aid of pressurized (12 bar) underwater pelletization. The average particle size was 1.4 mm.

A stream of steam was used to prefoam the pelletized material. The bulk density of the foamed beads of pelletized material was 99 kg/m³.

Comparative Example 3

5.7 parts of isopentane were incorporated by mixing into a melt made of 100 parts of component i-1, and 0.3 part of component iv-1, at a melt temperature of from 200° C. to 220° C.

The melt was conveyed at throughput 3.5 kg/h through a die plate with one hole (die diameter 0.65 mm). Compact pelletized material with narrow size distribution was produced with the aid of pressurized (12 bar) underwater pelletization. The average particle size was 1.4 mm.

A stream of steam was used to prefoam the pelletized material. The bulk density of the foamed beads of pelletized material was 117 kg/m³.

| Ex. | Component i-1 [parts] | Component ii-1 [parts] | Component iii-1 [parts] | Component iv-1 [parts] | Component v-1 [parts] | Minimum bulk density [kg/m³] |
|---|---|---|---|---|---|---|
| Inv. ex. 1 | 79.6 | 20 | 0.4 | 0.3 | 5.7 | 32 |
| Inv. ex. 2 | 99.6 | | 0.4 | 0.3 | 5.7 | 99 |
| Comp. ex. 3 | 100 | | | 0.3 | 5.7 | 117 |

The mixture of inventive examples 1 and 2 differs from that of comparative example 3 in the admixture of component iii.

For evaluation of inventive example 1 and comparative example 3, foaming time and densities of moldings were measured. The corresponding ability of the foamed beads to fuse to give foam slabs was also assessed qualitatively.

| Examples | Density of molding | Fusion |
| --- | --- | --- |
| Inv. ex. 1 | 42 kg/m³ | ++ |
| Comp. ex. 3 | 180 kg/m³ | -- |

Legend: ++ very good
+ good
− poor
−− very poor

These experiments were conducted by analogy with inventive example 1, but in a Leistritz 27 mm extruder.

Inventive Example 4

5.7 parts of isopentane (component v-1) were incorporated by mixing into a melt made of 79.6 parts of component i-1, 20 parts of component ii-1, 0.4 part of iii-1, and 0.3 part of iv-1, at a melt temperature of from 200° C. to 220° C. The amounts stated in parts are based on the entire amount of components i-1, ii-1, and iii-1.

The melt was conveyed at throughput 10.0 kg/h through a die plate with one hole (die diameter 0.8 mm). Compact pelletized material with narrow size distribution was produced with the aid of pressurized (9 bar) underwater pelletization. The average particle size was 1.4 mm.

A stream of steam was used to prefoam the pelletized material. The minimum bulk density of the foamed beads of pelletized material was 54 kg/m³.

Inventive Example 5

5.7 parts of a 50/50 mixture of component v-1 and component v-2 were incorporated by mixing into a melt made of 79.6 parts of i-1, 20 parts of ii-1, 0.4 part of iii-1, and 0.3 part of iv-1, at a melt temperature of from 200° C. to 220° C. The amounts stated in parts are based on the entire amount of components i-1, ii-1, and iii-1. The melt was conveyed at throughput 10.0 kg/h through a die plate with one hole (die diameter 0.8 mm). Compact pelletized material with narrow size distribution was produced with the aid of pressurized (9 bar) underwater pelletization. The average particle size was 1.4 mm.

A stream of steam was used to prefoam the pelletized material. The minimum bulk density of the foamed beads of pelletized material was 74 kg/m³.

Inventive Example 6

5.7 parts of n-pentane (component v-2) were incorporated by mixing into a melt made of 79.6 parts of i-1, 20 parts of ii-1, 0.4 part of iii-1, and 0.3 part of iv-1, at a melt temperature of from 200° C. to 220° C. The amounts stated in parts are based on the entire amount of components i-1, ii-1, and iii-1.

The melt was conveyed at throughput 10.0 kg/h through a die plate with one hole (die diameter 0.8 mm). Compact pelletized material with narrow size distribution was produced with the aid of pressurized (9 bar) underwater pelletization. The average particle size was 1.4 mm.

A stream of steam was used to prefoam the pelletized material. The minimum bulk density of the foamed beads of pelletized material was 94 kg/m³.

TABLE

| Example | Component i-1 [parts] | Component ii-1 [parts] | Component iii-1 [parts] | Component iv-1 [parts] | Component v [parts] | Minimum bulk density [kg/m³] |
| --- | --- | --- | --- | --- | --- | --- |
| Inv. ex. 4 | 79.6 | 20 | 0.4 | 0.3 | 5.7 of component v-1 | 54 |
| Inv. ex. 5 | 79.6 | 20 | 0.4 | 0.3 | 5.7 of component v-1 (50%) component v-2 (50%) | 74 |
| Inv. ex 6 | 79.6 | 20 | 0.4 | 0.3 | 5.7 of component v-2 | 94 |

The concentration of blowing agent and components i to iv is the same in inventive examples 4 to 6. Surprisingly, expansion behavior is better in inventive example 4 than in inventive examples 5 and 6, this being determined from lower minimum bulk density of the beads after full foaming. This represents a clear advantage through the use of isopentane as blowing agent in comparison with the use of n-pentane in this system.

Inventive Example 7

5.7 parts of isopentane (component v-1) and 0.5 part of carbon dioxide (vi-2) were incorporated by mixing into a melt made of 79.6 parts of component i-1, 20 parts of component ii-1, 0.4 part of component iii-1, and 0.3 part of component iv-1, at a melt temperature of from 200° C. to 220° C. The amounts stated in parts are based on the entire amount of components i-1, ii-1, and iii-1.

The melt was conveyed at throughput 3.5 kg/h through a die plate with one hole (die diameter 0.65 mm). Compact pelletized material with narrow size distribution was produced with the aid of pressurized (12 bar) underwater pelletization (water temperature 40° C.). The average particle size was 1.4 mm. The density of the impregnated pelletized material (crude beads) was 664 kg/m³.

A stream of steam was used to prefoam the pelletized material. The density of the foamed beads of pelletized material was 30 kg/m³. The minimum bulk density of the foamed beads of pelletized material was still 41 kg/m³ after 16 weeks.

Inventive Example 8

5.7 parts of isopentane (component v-1) and 0.1 part of nitrogen (vi-1) were incorporated by mixing in an extruder (Leistritz, 18 mm) into a melt made of 79.6 parts of component i-1, 20 parts of component ii-1, 0.4 part of component iii-1, and 0.3 part of component iv-1, at a melt temperature of 200° C. to 220° C. The amounts stated in parts are based on the entire amount of components i-1, ii-1, and iii-1.

The melt was conveyed at throughput 3.5 kg/h through a die plate with one hole (die diameter 0.65 mm). Compact pelletized material with narrow size distribution was produced with the aid of pressurized (12 bar) underwater pelletization (water temperature 40° C.). The average particle size was 1.4 mm. The density of the impregnated pelletized material (crude beads) was 650 kg/m³.

A stream of steam was used to prefoam the pelletized material. The density of the foamed beads of pelletized material was 36 kg/m³. The minimum bulk density of the foamed beads of pelletized material was still 38 kg/m³ after 16 weeks.

Inventive Example 9

5.7 parts of isopentane (component v-1) were incorporated by mixing in an extruder (Leistritz, 18 mm) into a melt made of 79.6 parts of component i-1, 20 parts of component ii-1, 0.4 part of component iii-1, and 0.3 part of component iv-1, at a melt temperature of 200° C. to 220° C. The amounts stated in parts are based on the entire amount of components i-1, ii-1, and iii-1.

The melt was conveyed at throughput 3.5 kg/h through a die plate with one hole (die diameter 0.65 mm). Compact pelletized material with narrow size distribution was produced with the aid of pressurized (12 bar) underwater pelletization (water temperature 20° C.). The average particle size was 1.4 mm. The density of the impregnated pelletized material (crude beads) was 700 kg/m³.

A stream of steam was used to prefoam the pelletized material. The density of the foamed beads of pelletized material was 52 kg/m³. The minimum bulk density of the foamed beads of pelletized material was still 126 kg/m³ after 16 weeks.

Inventive Example 11

5.7 parts of isopentane (component v-1) were incorporated by mixing in an extruder (Leistritz, 18 mm) into a melt made of 69.6 parts of component i-1, 30 parts of component ii-2, 0.4 part of component iii-1, and 0.3 part of component iv-1, at a melt temperature of 200° C. to 220° C. The amounts stated in parts are based on the entire amount of components i-1, ii-2, and iii-1.

The melt was conveyed at throughput 3.5 kg/h through a die plate with one hole (die diameter 0.65 mm). Compact pelletized material with narrow size distribution was produced with the aid of pressurized (12 bar) underwater pelletization. The average particle size was 1.4 mm.

A stream of steam was used to prefoam the pelletized material. The density of the foamed beads of pelletized material was 43 kg/m³.

Inventive Example 12

5.7 parts of isopentane (component v-1) and 0.05 part of nitrogen (vi-1) were incorporated by mixing into a melt made of 69.7 parts of component i-1, 30 parts of component ii-2, 0.3 part of component iii-1, and 0.3 part of component iv-1, at a melt temperature of 200° C. to 220° C.

The melt was conveyed at throughput 3.5 kg/h through a die plate with one hole (die diameter 0.65 mm). Compact pelletized material with narrow size distribution was pro-

TABLE

| Inventive examples | Comp. i-1 [parts] | Comp. ii-1 [parts] | Comp. iii-1 [parts] | Comp. iv-1 [parts] | Comp. v [parts] | Comp. vi [parts] | Minimum bulk density [kg/m³] |
|---|---|---|---|---|---|---|---|
| Inv. ex. 7 | 79.6 | 20 | 0.4 | 0.3 | 5.7 v-1 | 0.5 vi-2 | 30 |
| Inv. ex. 8 | 79.6 | 20 | 0.4 | 0.3 | 5.7 v-1 | 0.1 vi-1 | 36 |
| Inv. ex. 9 | 79.6 | 20 | 0.4 | 0.3 | 5.7 v-1 | | 52 |
| Inv. ex. 10 10° C. | 79.6 | 20 | 0.4 | 0.3 | 5.7 v-1 | | 34 |

Inventive Example 10

5.7 parts of isopentane (component v-1) were incorporated by mixing in an extruder (Leistritz, 18 mm) into a melt made of 79.6 parts of component i-1, 20 parts of component ii-1, 0.4 part of component iii-1, and 0.3 part of component iv-1, at a melt temperature of 200° C. to 220° C. The amounts stated in parts are based on the entire amount of components i-1, ii-1, and iii-1.

The melt was conveyed at throughput 3.5 kg/h through a die plate with one hole (die diameter 0.65 mm). Compact pelletized material with narrow size distribution was produced with the aid of pressurized (12 bar) underwater pelletization (water temperature 10° C.). The average particle size was 1.4 mm. The density of the impregnated pelletized material (crude beads) was 680 kg/m³.

A stream of steam was used to prefoam the pelletized material. The density of the foamed beads of pelletized material was 34 kg/m³. The minimum bulk density of the foamed beads of pelletized material was still 77 kg/m³ after 16 weeks.

duced with the aid of pressurized (12 bar) underwater pelletization. The average particle size was 1.4 mm.

A stream of steam was used to prefoam the pelletized material. The density of the foamed beads of pelletized material was 64 kg/m³.

Inventive Example 13

5.7 parts of isopentane (component v-1) and 0.1 part of nitrogen (vi-1) were incorporated by mixing into a melt made of 69.7 parts of component i-1, 30 parts of component ii-2, 0.3 part of component iii-1, and 0.3 part of component iv-1, at a melt temperature of 200° C. to 220° C.

The melt was conveyed at throughput 3.5 kg/h through a die plate with one hole (die diameter 0.65 mm). Compact pelletized material with narrow size distribution was produced with the aid of pressurized (12 bar) underwater pelletization. The average particle size was 1.4 mm.

A stream of steam was used to prefoam the pelletized material. The density of the foamed beads of pelletized material was 38 kg/m³.

Inventive Example 14

5.7 parts of isopentane (component v-1) and 0.5 part of carbon dioxide (vi-2) were incorporated by mixing into a melt made of 69.7 parts of component i-1, 30 parts of component ii-2, 0.4 part of component iii-1, and 0.3 part of component iv-1, at a melt temperature of 200° C. to 220° C.

The melt was conveyed at throughput 3.5 kg/h through a die plate with one hole (die diameter 0.65 mm). Compact pelletized material with narrow size distribution was produced with the aid of pressurized (12 bar) underwater pelletization. The average particle size was 1.4 mm.

A stream of steam was used to prefoam the pelletized material. The density of the foamed beads of pelletized material was 39 kg/m$^3$.

The advantageous constitution of polymer PM' comprising polylactic acid is apparent from comparison of inventive examples 1 and 14, which in essence differ in component ii.

|  | Inv. ex. 11 | Inv. ex. 12 | Inv. ex. 13 | Inv. ex. 14 |
|---|---|---|---|---|
| Component i-1 | 69.6 | 69.7 | 69.7 | 69.6 |
| Component ii-2 | 30 | 30 | 30 | 30 |
| Component iii-1 | 0.4 | 0.3 | 0.3 | 0.4 |
| Component iv-1 | 0.3 | 0.3 | 0.3 | 0.3 |
| Component v-1 | 5.7 | 5.7 | 5.7 | 5.7 |
| Component vi-2 | — | 0.05 | 0.1 | — |
| Component vi-2 | — | — | — | 0.5 |
| Bulk density of crude beads [kg/m$^3$] | 765 | 661 | 648 | 720 |
| Minimum bulk density of foam [kg/m$^3$] | 43 | 40 | 38 | 39 |
| Minimum bulk density of foam [kg/m$^3$] after 6 weeks | Not foamable | 56 | 38 | 53 |

The crude beads from inventive example 1 and inventive example 14 were prefoamed and fused to give test specimens with comparable molding density of 50 g/l.

The test specimens from inventive example 14 exhibit better heat resistance in the form of a dimensional stability value smaller than 1% in contrast with a dimensional stability value greater than 2% in inventive example 1.

The test specimen from inventive example 14 moreover exhibits better mechanical stability than the test specimen from inventive example 1, this being apparent in higher compressive strength and higher bending energy.

|  | Inventive example 1 |  | Inventive example 14 |  |
|---|---|---|---|---|
| Molding density (g/l) | 50 |  | 50 |  |
| Dimensional stability at 90° C., 30% humidity | Δε(l) in % | 0.9 | Δε(l) in % | 0.2 |
|  | Δε(b) in % | 0.2 | Δε(b) in % | 0.2 |
|  | Δε(b) in % | 2.2 | Δε(d) in % | 0.4 |
| Bending energy (KPa) | 344 |  | 413 |  |
| Compressive strength (KPa) | 141 |  | 176 |  |

The invention claimed is:

1. A process for producing an expandable pelletized material which comprises polylactic acid, said process comprises the following steps:
   a) melting and mixing to incorporate the following components to form a polymer melt:
      i) from 50 to 99.9% by weight, based on the total weight of components i) to iii), of polylactic acid,
      ii) from 0 to 49.9% by weight, based on the total weight of components i) to iii), of at least one polyester based on aliphatic and/or aromatic dicarboxylic acids and on aliphatic dihydroxy compound,
      iii) from 0.1 to 2% by weight, based on the total weight of components i) to iii), of a diepoxide or polyepoxide, and
      iv) from 0.1 to 5% by weight, based on the total weight of components i) to iii), of a nucleating agent,
   b) mixing to incorporate v) from 1 to 7% by weight, based on the total weight of components i) to iv), of an organic blowing agent selected from the group consisting of isopentane and n-pentane, and vi) from 0.05 to 0.5% by weight of a co-blowing agent selected from the group consisting of nitrogen, carbon dioxide, argon, helium, and mixtures thereof into the polymer melt by means of a static or dynamic mixer at a temperature of at least 140° C.,
   c) discharging through a die plate with holes, the diameter of which at the exit from the die is at most 1.5 mm, and
   d) pelletizing the melt comprising blowing agent directly downstream of the die plate, and under water, at a pressure in the range from 1 to 20 bar,
   wherein the expandable pelletized material has a bulk density in the range from 580 to 700 kg/m$^3$ prior to any prefoaming treatment of the expandable pelletized material.

2. The process according to claim 1, wherein the underwater pelletization process is carried out at from 20 to 80° C.

3. The process according to claim 1, wherein the polymer comprising polylactic acid produced in stage a) comprises a mixture of
   i) from 50 to 98.9% by weight, based on the total weight of components i) to iii), of polylactic acid,
   ii) from 1 to 49.9% by weight, based on the total weight of components i) to iii), of at least one polyester based on aliphatic and/or aromatic dicarboxylic acids and on aliphatic dihydroxy compound,
   iii) from 0.1 to 2% by weight, based on the total weight of components i) to iii), of a copolymer which comprises epoxy groups and which is based on styrene, acrylate, and/or methacrylate, and
   iv) from 0 to 10% by weight, based on the total weight of components i) to iii), of one or more additives.

4. The process according to claim 1, wherein component i) used in stage a) comprises polylactic acid with MVR of from 5 to 8 ml/10 minutes to ISO 1133 [190° C./2.16 kg].

5. The process according to claim 1, wherein component i) used in stage a) comprises polylactic acid with a low-temperature-crystallization onset temperature in the range from 80° C. to 125° C., measured by DSC at a heating rate of 20K/min.

6. The process according to claim 1, wherein the organic blowing agent used in stage b) comprises isopentane.

7. The process according to claim 1, wherein the mixing step b) is conducted at a temperature of at least 180° C.

8. The process according to claim 1, wherein component iii) is a diepoxide.

9. The process according to claim 1, wherein the co-blowing agent vi) is nitrogen.

10. The process according to claim 1, wherein the co-blowing agent vi) is carbon dioxide.

11. The process according to claim 1, wherein the co-blowing agent vi) is argon.

12. The process according to claim 1, wherein the co-blowing agent vi) is helium.

13. The process according to claim 1, wherein the expandable pelletized material has a bulk density in the range from 580 to less than 700 kg/m$^3$ prior to any prefoaming treatment of the expandable pelletized material.

14. The process according to claim 1, wherein the organic blowing agent used in stage b) comprises n-pentane.

15. The process according to claim 1, wherein from 3 to 7% by weight, based on the total weight of components i) to iv), of the organic blowing agent is used.

16. A process for producing an expandable pelletized material which comprises polylactic acid, said process comprises the following steps:
a) melting and mixing to incorporate the following components to form a polymer melt:
   i) from 50 to 98.9% by weight, based on the total weight of components i) to iii), of polylactic acid,
   ii) from 1 to 44.9% by weight, based on the total weight of components i) to iii), of at least one polyester based on aliphatic dicarboxylic acids and on aliphatic dihydroxy compound or derived from polyalkylene succinate-co-terephthalate,
   iii) from 0.1 to 2% by weight, based on the total weight of components i) to iii), of a copolymer which comprises epoxy groups and which is based on styrene, acrylate, and/or methacrylate, and
   iv) from 0.1 to 2% by weight, based on the total weight of components i) to iii), of a nucleating agent,
b) mixing to incorporate v) from 1 to 7% by weight, based on the total weight of components i) to iv), of an organic blowing agent selected from the group consisting of isopentane and n-pentane, and vi) from 0.05 to 0.5% by weight of a co-blowing agent selected from the group consisting of nitrogen, carbon dioxide, argon, helium, and mixtures thereof into the polymer melt by means of a static or dynamic mixer at a temperature of at least 140° C.,
c) discharging through a die plate with holes, the diameter of which at the exit from the die is at most 1.5 mm, and
d) pelletizing the melt comprising blowing agent directly downstream of the die plate, and under water, at a pressure in the range from 1 to 20 bar, wherein the expandable pelletized material has cavities with an average diameter in the range from 0.1 to 50 μm and has a bulk density in the range from 580 to 700 kg/m$^3$ prior to any prefoaming treatment of the expandable pelletized material.

17. The process of claim 16, wherein the expandable pelletized material has from 50 to 300 cavities/mm$^2$ of cross-sectional area.

18. The process of claim 16, wherein the underwater pelletization process is carried out at from 20 to 80° C.

19. The process of claim 16, wherein the mixing step b) is conducted at a temperature of at least 180° C.

20. The process of claim 16, wherein talc is used as the nucleating agent iv) and nitrogen is used as the co-blowing agent vi).

* * * * *